(12) United States Patent
Ziraldo

(10) Patent No.: US 11,135,981 B1
(45) Date of Patent: Oct. 5, 2021

(54) MOUNTING DEVICE FOR HEADREST OF VEHICLE SEAT

(71) Applicant: American Honda Motor Co., Inc., Torrance, CA (US)

(72) Inventor: Nicholas P. Ziraldo, Powell, OH (US)

(73) Assignee: AMERICAN HONDA MOTOR CO., INC., Torrance, CA (US)

( * ) Notice: Subject to any disclaimer, the term of this patent is extended or adjusted under 35 U.S.C. 154(b) by 28 days.

(21) Appl. No.: 16/815,680

(22) Filed: Mar. 11, 2020

(51) Int. Cl.
    *B60R 11/02* (2006.01)
    *B60R 7/00* (2006.01)
    *B60R 7/04* (2006.01)
    *B60R 11/00* (2006.01)

(52) U.S. Cl.
    CPC .......... *B60R 7/043* (2013.01); *B60R 11/0229* (2013.01); *B60R 11/0241* (2013.01); *B60R 11/0252* (2013.01); *B60R 2011/0017* (2013.01); *B60R 2011/0059* (2013.01); *B60R 2011/0276* (2013.01)

(58) Field of Classification Search
    CPC . B60R 7/043; B60R 11/0241; B60R 11/0252; B60R 2011/0017; B60R 2011/0059; B60R 2011/0276
    USPC ............. 224/275; 248/316.4, 229.21, 229.22
    See application file for complete search history.

(56) References Cited

U.S. PATENT DOCUMENTS

| | | | |
|---|---|---|---|
| 5,005,813 A | 4/1991 | Lawrence | |
| 7,364,230 B2 * | 4/2008 | Zheng | B60R 11/0235 297/188.2 |
| 8,905,367 B2 | 12/2014 | Bury | |
| 9,010,597 B2 | 4/2015 | Prescott et al. | |
| 9,296,340 B2 | 3/2016 | Ackeret et al. | |
| 9,743,541 B1 * | 8/2017 | Chang | F16M 11/10 |
| 2011/0155873 A1 | 6/2011 | Montag et al. | |
| 2019/0263326 A1 | 8/2019 | Yu | |

FOREIGN PATENT DOCUMENTS

| | | |
|---|---|---|
| CN | 203819140 | 9/2014 |
| CN | 203819147 | 9/2014 |
| CN | 204567486 | 8/2015 |
| CN | 205800969 | 12/2016 |
| CN | 207029053 | 2/2018 |

* cited by examiner

*Primary Examiner* — Justin M Larson
(74) *Attorney, Agent, or Firm* — Rankin Hill & Clark LLP

(57) ABSTRACT

A mounting device for a smart device is adapted for removable connection to a headrest of a vehicle seat. The mounting device includes a first clamp including a first opening adapted for sliding receipt of a first headrest post of the headrest, and a second clamp separate from the first clamp and including a second opening adapted for sliding receipt of a second headrest post of the headrest. An adjustment mechanism operably connects the first clamp and the second clamp. The adjustment mechanism includes a cam latch aligned along a lateral distance separating the first clamp from the second clamp. The cam latch has a released position allowing for selective adjustment of the lateral distance between the first clamp from the second clamp and an engaged position for fixing the lateral distance between the first clamp and the second clamp.

20 Claims, 4 Drawing Sheets

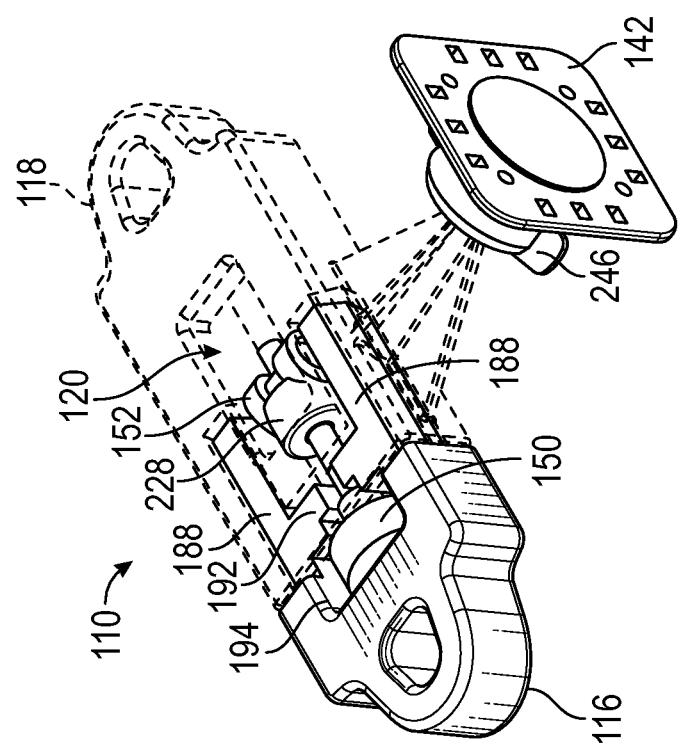
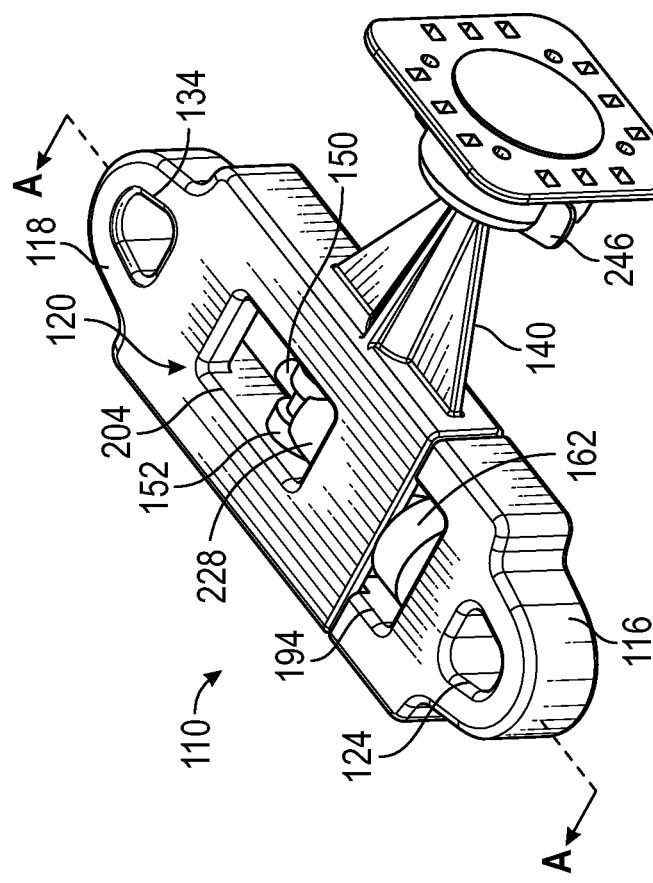
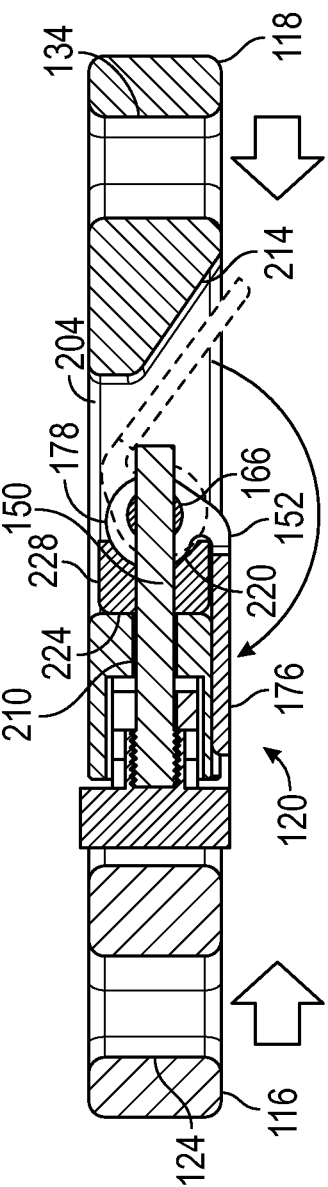
FIG. 3
FIG. 4
FIG. 5

MOUNTING DEVICE FOR HEADREST OF VEHICLE SEAT

BACKGROUND

Electronic devices or smart devices are widely used by passengers of vehicles. Such devices provide the benefit of portability, allowing the passengers to bring the device with them, for use in the vehicle, while also allowing the passengers to take the device with them as they exit the vehicle. There have been numerous prior proposals for mounting these smart devices in or from the back of, or between, the front seats of a vehicle so that passengers in the rear seats may listen to, watch, or interact with such devices. For example, it is known to hang a smart device over the top of the front seat or from the front seat headrest or headrest posts by means of straps, brackets or clamps. With these known mounting arrangements, the smart device is either not mounted in a stable position or, if clamped or otherwise fitted to the headrest posts, may impede movement of the headrest.

BRIEF DESCRIPTION

According to one aspect, a mounting device for a smart device is adapted for removable connection to a headrest of a vehicle seat. The mounting device comprises a first clamp including a first opening adapted for sliding receipt of a first headrest post of the headrest, and a second clamp separate from the first clamp and including a second opening adapted for sliding receipt of a second headrest post of the headrest. An adjustment mechanism operably connects the first clamp and the second clamp. The adjustment mechanism includes a cam latch aligned along a lateral distance separating the first clamp from the second clamp. The cam latch has a released position allowing for selective adjustment of the lateral distance between the first clamp from the second clamp and an engaged position for fixing the lateral distance between the first clamp and the second clamp.

According to another aspect, a mounting device for a smart device is adapted for removable connection to a headrest of a vehicle seat. The mounting device comprises a first clamp including a first opening adapted for sliding receipt of a first headrest post of the headrest, and a second clamp including a second opening adapted for sliding receipt of a second headrest post of the headrest. An adjustment mechanism operably connects the first clamp and the second clamp. The adjustment mechanism includes a connector extended along a lateral distance separating the first clamp from the second clamp and a cam latch mounted to the connector. The cam latch has a released position allowing for selective adjustment of the lateral distance between the first clamp from the second clamp and an engaged position for fixing the lateral distance between the first clamp and the second clamp. With the cam latch in the released position rotation of the connector adjusts the lateral distance between the first clamp and the second clamp.

According to another aspect, a mounting device for a smart device is adapted for removable connection to a headrest of a vehicle seat. The mounting device comprises a first clamp including a first opening adapted for sliding receipt of a first headrest post of the headrest, and a second clamp separate from the first clamp and including a second opening adapted for sliding receipt of a second headrest post of the headrest. An adjustment mechanism operably connects the first clamp and the second clamp. The adjustment mechanism includes a connector extended between the first clamp and the second clamp, an axle threadingly secured to the connector, and a cam latch rotatable about an axis defined by the axle between a released position allowing for selective adjustment of a lateral distance separating the first clamp from the second clamp and an engaged position for fixing the lateral distance between the first clamp and the second clamp. With the cam latch in the released position rotation of the connector adjusts the lateral distance between the first clamp and the second clamp.

BRIEF DESCRIPTION OF THE DRAWINGS

FIG. 3 is a perspective view of the exemplary mounting clamp.

FIG. 4 is a perspective view of the exemplary mounting clamp similar to FIG. 3 but with one of the first clamp and the second clamp shown in hidden lines to depict the adjustment mechanism.

FIG. 5 is a cross-sectional view of the exemplary mounting clamp taken generally along line A-A of FIG. 3, depicting a cam latch of the adjustment mechanism in an engaged position (shown in solid lines) and a released position (shown in hidden lines).

DETAILED DESCRIPTION

Figure 1:
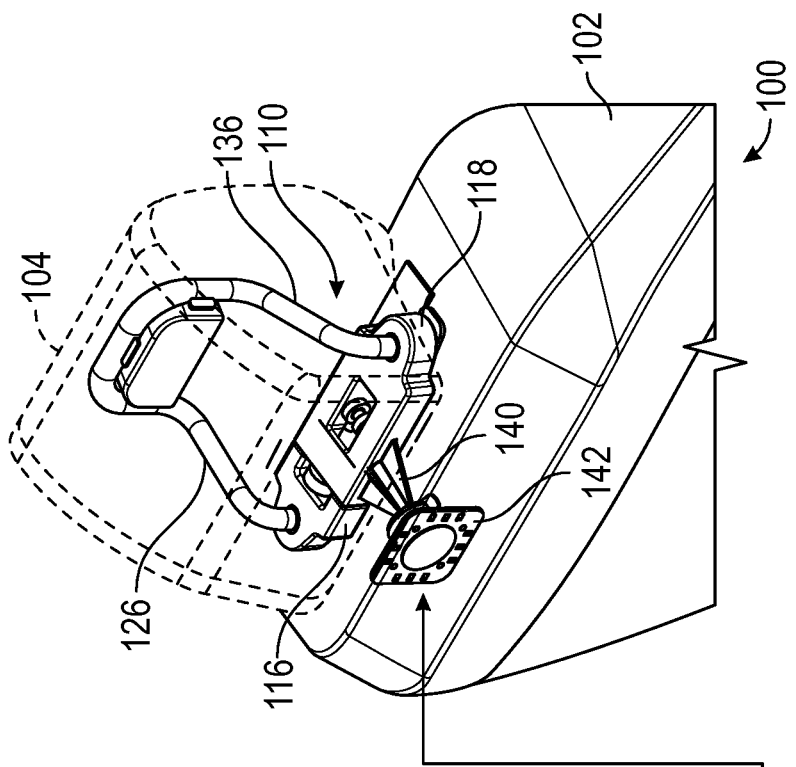
FIG. 1 is a perspective rear view of a seat back including a headrest (shown in hidden lines) of a vehicle seat, the head rest having mounted thereto an exemplary mounting device configured to mount an electronic device or smart device.
Figure 1:
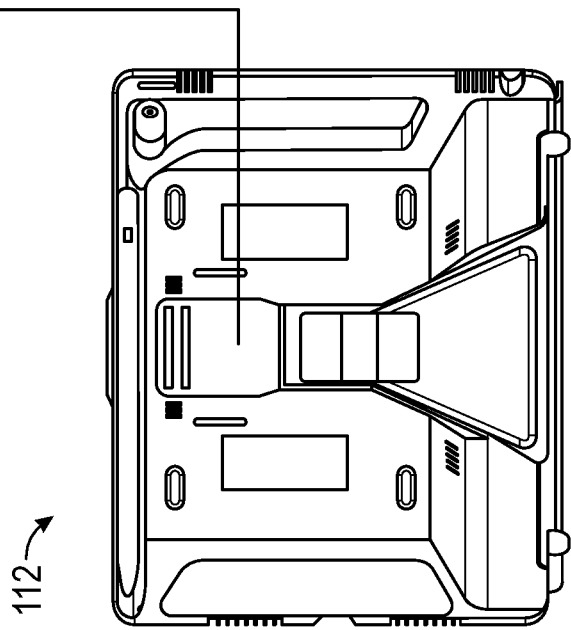

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 schematically illustrates a vehicle seat 100 including a seat back 102 and a headrest 104 (shown in hidden lines) mounted to an upper portion of the seat back. An exemplary mounting device 110 configured to mount an electronic device or smart device 112 is removably connected to the headrest 104. The terms "electronic device" or "smart device" are generic terms and are to be interpreted in a non-limiting manner, it being understood that the terms may refer to any portable device having a screen and a user interface. The smart device may for instance be a smart phone, a laptop computer, or a tablet, as non-limiting examples. The smart device may include a touch screen display and a forward facing camera, for example. However, it should be understood that any form of suitable smart device or related electronic device, for example, a global position system, may be mounted to the mounting device 110 without departing from the scope of the present disclosure.

With reference to FIGS. 2-6, the exemplary mounting device 110 comprises a first clamp 116, a second clamp 118 separate from the first clamp, and an adjustment mechanism 120 operably connecting the first clamp and the second clamp. The first clamp 116 includes a first opening 124 adapted for sliding receipt of a first headrest post 126 of the headrest 104. The second clamp 118 includes a second opening 134 adapted for sliding receipt of a second headrest post 136 of the headrest 104. The adjustment mechanism 120 is adapted to adjust a lateral spacing or distance (lateral meaning along a widthwise direction of the vehicle seat) between the first clamp 116 and the second clamp 118. In addition, one of the first clamp 116 and the second clamp 118 includes a mounting arm 140 extended therefrom, an end portion of the mounting arm configured for connection to a smart device holder 142. In the depicted aspect, the mounting arm 140 is integral with and extends from the second clamp 118.

According to the present disclosure, the adjustment mechanism 120 includes a connector 150 and a cam latch 152 mounted to the connector. The connector 150 is extended along the lateral distance separating the first clamp 116 from the second clamp 118 and together with the cam latch 152 interconnects the first and second clamps. The cam latch 152, which is also aligned along the lateral distance separating the first clamp from the second clamp, has a released position (shown in hidden lines in FIG. 5) and an engaged position (shown in solid lines in FIG. 5). In the released position of the cam latch 152, the lateral distance between the first and second clamps 116, 118 can be adjusted to match the spacing between the first and second headrest posts 126, 136. This selective adjustment between the first and second clamps 116, 118 allows the mounting device 110 to be connected to various styles of headrests having differing spacings between the headrest posts. In the engaged position of the cam latch 152, the lateral distance between the first clamp 116 and the second clamp 118 is fixed, which, in turn, fixedly secures the mounting device 110 to the headrest 104.

According to the present disclosure, the connector 150 is coupled to the cam latch 152 in a manner whereby rotation of the connector 150 moves the connector toward or away from the cam latch 152. In the depicted aspect, the connector 150 is threadingly secured to the cam latch 152, and with the cam latch in the released position rotation of the connector 150 about an axis defined by the connector adjusts the lateral distance between the first clamp 116 and the second clamp 118. To allow for this connection to the cam latch 152, the connector 150 is a threaded fastener having a first end portion 156 and a threaded second end portion 158 (see FIG. 2). The first end portion 156 is provided with an enlarged head 162 for mounting to the first clamp 116. The head 162 also allows for ease of rotation of the connector 150 by the user. The adjustment mechanism 120 further includes an axle 166 mounted to the cam latch 152. The axle 166 has a threaded opening 168 for connection to the threaded second end portion 158. Because of this threaded connection, the axle 166 is fixed relative to the cam latch 152. Therefore, in order for the cam latch to move between the released position and the engaged position, the cam latch 152 is adapted to rotate about an axis defined by the axle 166 (see FIG. 5). To this end, the depicted cam latch 152 includes a gripping portion 176, which can be in the shape of a rectangular base, and a hub 178 extended from the gripping portion. The hub 178 is rotatably fitted on the axle 166 and includes a cutout 180 for exposing that portion of the axle 166 that has the threaded opening 168.

Figure 2:
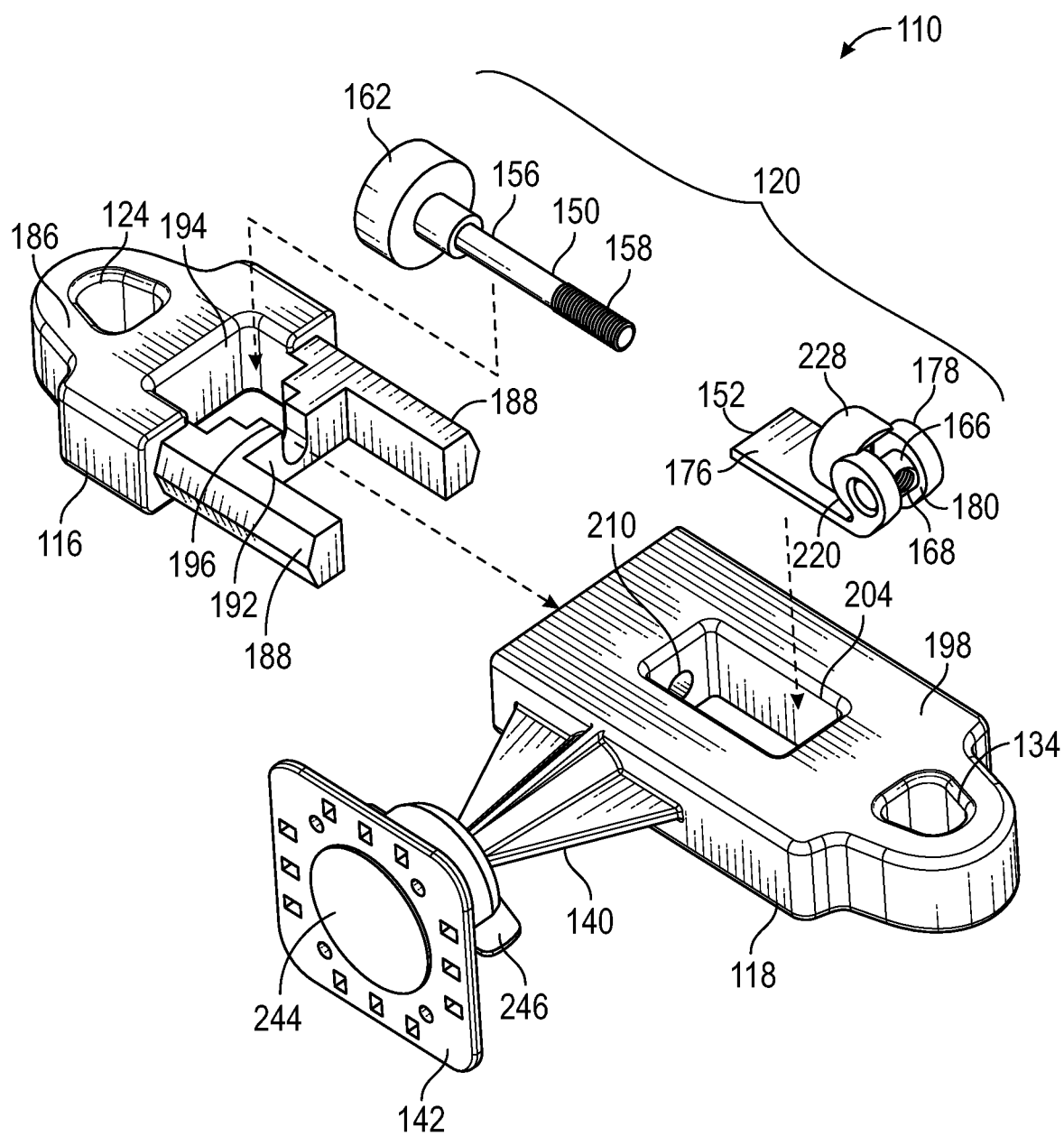
FIG. 2 is an exploded perspective view of the exemplary mounting device, the mounting device generally including a first clamp, a second clamp and an adjustment mechanism operably connecting the first clamp and the second clamp.
Figure 6:
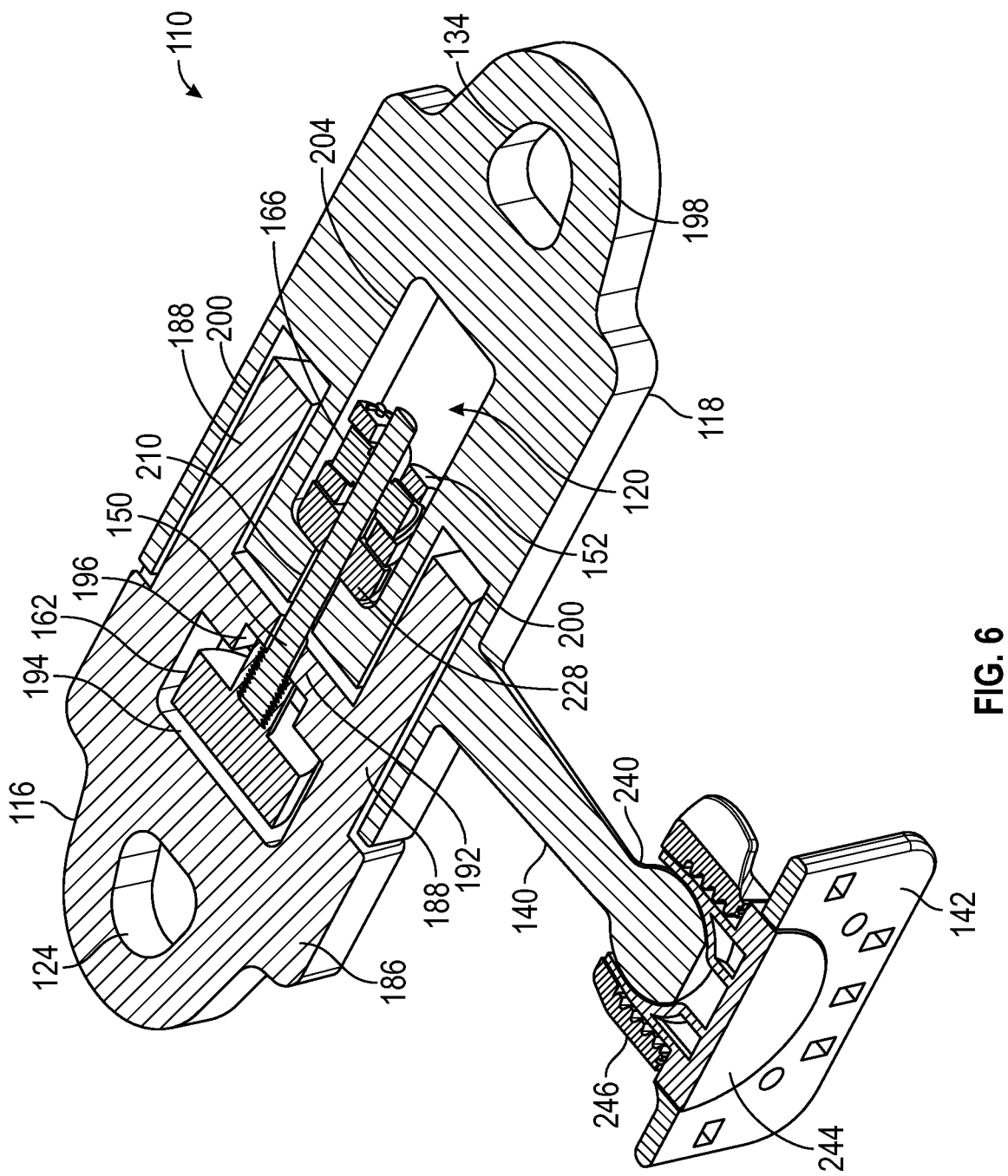
FIG. 6 is a cross-sectional perspective view of the exemplary mounting clamp.

As indicated previously, the first end portion 156 of the connector 150 is mounted to the first clamp 116. As best depicted in FIGS. 2 and 6, the first clamp 116 includes a body 186 having the first opening 124. A pair of parallel fingers 188 project from the body 186, and a bridge 192 spans between and interconnects the fingers 188. A through hole 194 is defined between the bridge 192 and the body 186. The bridge 192 includes a recessed portion or cutout 196 shaped to receive the first end portion 156, with the head 162 located in the through hole 194. With additional reference to FIG. 4, the second clamp 118 includes a body 198 having the second opening 134. The body 198 further includes a pair of openings 200 for receiving the pair of fingers 188. The body 198 can also be configured to at least partially receive the bridge 192. In addition, the body 198 of the second clamp 118 defines a through hole 204 dimensioned to receive the cam latch 152. In assembly, the first end portion 156 of the connector 150 is positioned within the cutout 196 on the first clamp which locates the head 162 in the through hole 194. The fingers 188 which flank the connector 150 are received in the openings 200 and the threaded second end portion 158 of the connector is extended through a bore 210 formed in the second clamp. The cam latch 152 is positioned in the through hole 204 and the second end portion 158 projected into the through hole 204 is threaded into the threaded opening 168 of the axle. Therefore, the second end portion 158 of the connector 150 supports the cam latch 152 within the through hole 204 allowing the cam latch to freely rotate between the released position and the engaged position. In FIG. 5, the second clamp 118 defines a stop 214 for the cam latch 152 in the released position, and the cam latch in the engaged position is substantially flush with a bottom surface of the second clamp 118.

It should be appreciated that the cam latch 152 is configured such that rotation of the cam latch from the released portion to the engaged position moves a camming surface 220 defined by the hub 178 of the cam latch 152 into engagement with an inner surface 224 of the second clamp 118 that defines the through hole 204 (see FIG. 5). According to one aspect, the adjustment mechanism 120 can include a washer 228 connected to the cam latch 152. The washer 228 is interposed between the hub 178 and the inner surface 224, and the camming surface 220 is shaped to press the washer 228 into direct contact with the inner surface 224 in the engaged position of the cam latch 152. It should further be appreciated that because of the direct connection between the connector 150 and the axle 166, the adjustment mechanism 120 is configured such that rotation of the cam latch 152 from the released portion toward the engaged position pulls the connector 150 toward the cam latch 152, and, in turn, pulls the first clamp 116 in the lateral direction toward the second clamp 118. To prevent the mounting device 110 from sliding on the first and second headrest posts 126, 136 when the cam latch 152 is in the engaged position, each of the first opening 124 of the first clamp 116 and the second opening 134 of the second clamp 118 is wedge shaped in top view of the mounting device 110. Therefore, movement of the first clamp 116 toward the second clamp 118 presses the first headrest post 126 into a tapered section of the first opening 124 to prevent sliding movement of the first clamp 116 on the first headrest post, and movement of the first clamp 116 toward the second clamp 118 also presses the second headrest post 136 into a tapered section of the second opening 134 to prevent sliding movement of the second clamp 118 on the second headrest post.

With reference to FIG. 6, and as indicated above, the second clamp 118 includes the mounting arm 140 configured for connection to the smart device holder 142. To allow for rotation of the smart device holder 142 on the mounting arm, an end portion 240 of the mounting arm 140 can be ball shaped. The smart device holder 142 includes a mount 244 shaped to receive the ball shaped end portion 240 and a lock 246 provided on the mount can fix the mount 244 on the end portion 240, which, in turn, fixes a position of the smart device 112 relative to the seat back 102 of the vehicle seat.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A mounting device for a smart device, the mounting device adapted for removable connection to a headrest of a vehicle seat, the mounting device comprising:
   a first clamp including a first opening adapted for sliding receipt of a first headrest post of the headrest;
   a second clamp separate from the first clamp and including a second opening adapted for sliding receipt of a second headrest post of the headrest; and
   an adjustment mechanism operably connecting the first clamp and the second clamp, the adjustment mechanism including a cam latch aligned along a lateral distance separating the first clamp from the second clamp, the cam latch having a released position allowing for selective adjustment of the lateral distance between the first clamp from the second clamp and an engaged position for fixing the lateral distance between the first clamp and the second clamp.

2. The mounting device of claim 1, wherein the adjustment mechanism includes a connector interconnecting the first clamp and the second clamp, the connector secured to the cam latch.

3. The mounting device of claim 2, wherein the connector is threadingly secured to the cam latch, and with the cam latch in the released position rotation of the connector about an axis defined by the connector adjusts the lateral distance between the first clamp and the second clamp.

4. The mounting device of claim 3, wherein the adjustment mechanism includes an axle, the connector threadingly secured to the axle, and the cam latch is rotatable about an axis defined by the axle.

5. The mounting device of claim 3, wherein the connector is a threaded fastener having a first end portion mounted to the first clamp and a second end portion extended through a bore formed in the second clamp, the second end portion secured to the cam latch.

6. The mounting device of claim 5, wherein the second clamp defines a through hole dimensioned to receive the cam latch, and the second end portion of the connector supports the cam latch within the through hole, wherein the cam latch is configured such that rotation of the cam latch from the released portion to the engaged position moves a camming surface of the cam latch into engagement with an inner surface of the second clamp that defines the through hole.

7. The mounting device of claim 6, wherein the adjustment mechanism includes a washer connected to the cam latch, and the camming surface is shaped to press the washer into direct contact with the inner surface in the engaged position of the cam latch.

8. The mounting device of claim 2, wherein the adjustment mechanism is configured such that rotation of the cam latch from the released portion toward the engaged position pulls the connector toward the cam latch, and, in turn, pulls the first clamp toward the second clamp.

9. The mounting device of claim 8, wherein the first opening of the first clamp is wedge shaped in top view of the mounting device, wherein movement of the first clamp toward the second clamp presses the first headrest post into a tapered section of the first opening to prevent sliding movement of the first clamp on the first headrest post.

10. The mounting device of claim 9, wherein the second opening of the second clamp is wedge shaped in top view of the mounting device, wherein movement of the first clamp toward the second clamp presses the second headrest post into a tapered section of the second opening to prevent sliding movement of the second clamp on the second headrest post.

11. The mounting device of claim 1, wherein one of the first clamp and the second clamp includes a pair of fingers flanking the connector, and the other of the first clamp and the second clamp includes a pair of openings for receiving the pair of fingers.

12. The mounting device of claim 1, wherein one of the first clamp and the second clamp includes a mounting arm extended therefrom, an end portion of the mounting arm configured for connection to a smart device holder.

13. A mounting device for a smart device, the mounting device adapted for removable connection to a headrest of a vehicle seat, the mounting device comprising:
   a first clamp including a first opening adapted for sliding receipt of a first headrest post of the headrest;
   a second clamp including a second opening adapted for sliding receipt of a second headrest post of the headrest; and
   an adjustment mechanism operably connecting the first clamp and the second clamp, the adjustment mechanism including a connector extended along a lateral distance separating the first clamp from the second clamp and a cam latch mounted to the connector, the cam latch having a released position allowing for selective adjustment of the lateral distance between the first clamp from the second clamp and an engaged position for fixing the lateral distance between the first clamp and the second clamp, and with the cam latch in the released position rotation of the connector adjusts the lateral distance between the first clamp and the second clamp.

14. The mounting device of claim 13, wherein the adjustment mechanism is configured such that rotation of the cam latch from the released portion toward the engaged position pulls the connector toward the cam latch, and, in turn, pulls the first clamp toward the second clamp.

15. The mounting device of claim 13, wherein the adjustment mechanism includes an axle, the connector threadingly secured to the axle, and the cam latch is rotatable about an axis defined by the axle.

16. The mounting device of claim 15, wherein the connector is a threaded fastener having a first end portion with a head mounted to the first clamp and a second end portion extended through a bore formed in the second clamp, the second end portion threadingly secured to the axle.

17. The mounting device of claim 16, wherein the second clamp defines a through hole dimensioned to receive the cam latch, and the second end portion of the connector supports the cam latch within the through hole,
   wherein the adjustment mechanism includes a washer connected to the cam latch, the second end portion of the connector extended through the washer, and
   wherein the cam latch is configured such that rotation of the cam latch from the released portion to the engaged position moves a camming surface of the cam latch into engagement with the washer to press the washer into direct contact with an inner surface of the second clamp that defines the through hole.

18. A mounting device for a smart device, the mounting device adapted for removable connection to a headrest of a vehicle seat, the mounting device comprising:
- a first clamp including a first opening adapted for sliding receipt of a first headrest post of the headrest;
- a second clamp separate from the first clamp and including a second opening adapted for sliding receipt of a second headrest post of the headrest; and
- an adjustment mechanism operably connecting the first clamp and the second clamp, the adjustment mechanism including:
- a connector extended between the first clamp and the second clamp,
- an axle threadingly secured to the connector, and
- a cam latch rotatable about an axis defined by the axle between a released position allowing for selective adjustment of a lateral distance separating the first clamp from the second clamp and an engaged position for fixing the lateral distance between the first clamp and the second clamp, wherein with the cam latch in the released position rotation of the connector adjusts the lateral distance between the first clamp and the second clamp.

19. The mounting device of claim 18, wherein the second clamp defines a through hole dimensioned to receive the cam latch, and the connector supports the cam latch within the through hole,
- wherein the adjustment mechanism includes a washer connected to the cam latch, and the cam latch is configured such that rotation of the cam latch from the released portion to the engaged position moves a camming surface of the cam latch into engagement with the washer to press the washer into direct contact with an inner surface of the second clamp that defines the through hole.

20. The mounting device of claim 18, wherein each of the first opening of the first clamp and the second opening of the second clamp is wedge shaped in top view of the mounting device,
- wherein movement of the first clamp toward the second clamp presses the first headrest post into a tapered section of the first opening to prevent sliding movement of the first clamp on the first headrest post and presses the second headrest post into a tapered section of the second opening to prevent sliding movement of the second clamp on the second headrest post.

* * * * *